United States Patent
Brisebois

(10) Patent No.: US 7,216,011 B2
(45) Date of Patent: May 8, 2007

(54) CONCURRENT MODELING TECHNIQUE FOR A PART AND ITS TOOLING

(75) Inventor: Philippe Brisebois, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/084,490

(22) Filed: Mar. 18, 2005

(65) Prior Publication Data

US 2006/0212160 A1  Sep. 21, 2006

(51) Int. Cl.
  *G06F 19/00* (2006.01)
(52) U.S. Cl. .......................................... 700/182; 700/98
(58) Field of Classification Search ................. 700/17, 700/18, 28–32, 95–98, 105, 178–185
  See application file for complete search history.

(56) References Cited

U.S. PATENT DOCUMENTS

| | | | | |
|---|---|---|---|---|
| 5,757,649 A | * | 5/1998 | Kato | .................. 700/182 |
| RE36,602 E | * | 3/2000 | Sebastian et al. | ............. 700/97 |
| 6,725,184 B1 | * | 4/2004 | Gadh et al. | ..................... 703/2 |
| 6,748,346 B2 | * | 6/2004 | Ujiie | ............................ 703/1 |
| 6,901,356 B1 | * | 5/2005 | Arita | ............................ 703/7 |
| 2002/0123812 A1 | * | 9/2002 | Jayaram et al. | ............... 700/98 |
| 2002/0151999 A1 | * | 10/2002 | Wu et al. | ..................... 700/95 |
| 2003/0171842 A1 | * | 9/2003 | Teramoto et al. | ........... 700/182 |
| 2004/0186759 A1 | * | 9/2004 | Fukui et al. | ................... 705/7 |
| 2005/0171629 A1 | * | 8/2005 | Suh et al. | ................... 700/159 |

\* cited by examiner

*Primary Examiner*—M. N. Von Buhr
(74) *Attorney, Agent, or Firm*—Ralph E. Smith

(57) ABSTRACT

A tooling and part design method automatically detects tooling and machining interferences with a desired part design. A user selects a mechanical component. Data indicative of the mechanical component, such as a part template, is determined and displayed to the user. The user selects one or more design parameters of the mechanical component to modify. Any necessary tooling and/or machining functions are embedded in the data, and performed automatically on the mechanical component when the user modifies a design parameter. Any interferences caused by the modification are automatically identified to the user.

7 Claims, 5 Drawing Sheets

CONCURRENT MODELING TECHNIQUE FOR A PART AND ITS TOOLING

FIELD OF THE INVENTION

The present invention relates to tooling automotive components, and more particularly to concurrently modeling automotive components and the tooling thereof.

BACKGROUND OF THE INVENTION

Manufacturing tooling capabilities for mechanical parts may be limited due to the complexity of the parts. This is especially true in automotive applications. Spatial limitations can cause difficulty during initial design, manufacturing, and tooling of the parts.

In particular, it can be difficult to perform actions associated with machining, handling, and assembling of the part due to interferences between the part and the particular tool being used. For example, although it may visually appear that an appropriate tool can be used at a particular location on a part, actual performance may result in permanent damage to the part.

SUMMARY OF THE INVENTION

A tooling and part design method comprises selecting a mechanical component. Data that is indicative of the mechanical component is determined. The data is modified in order to alter one or more dimensions of the mechanical component. A tooling function to perform on the mechanical component is selected automatically. Interference between the tooling function and the mechanical component is identified automatically.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
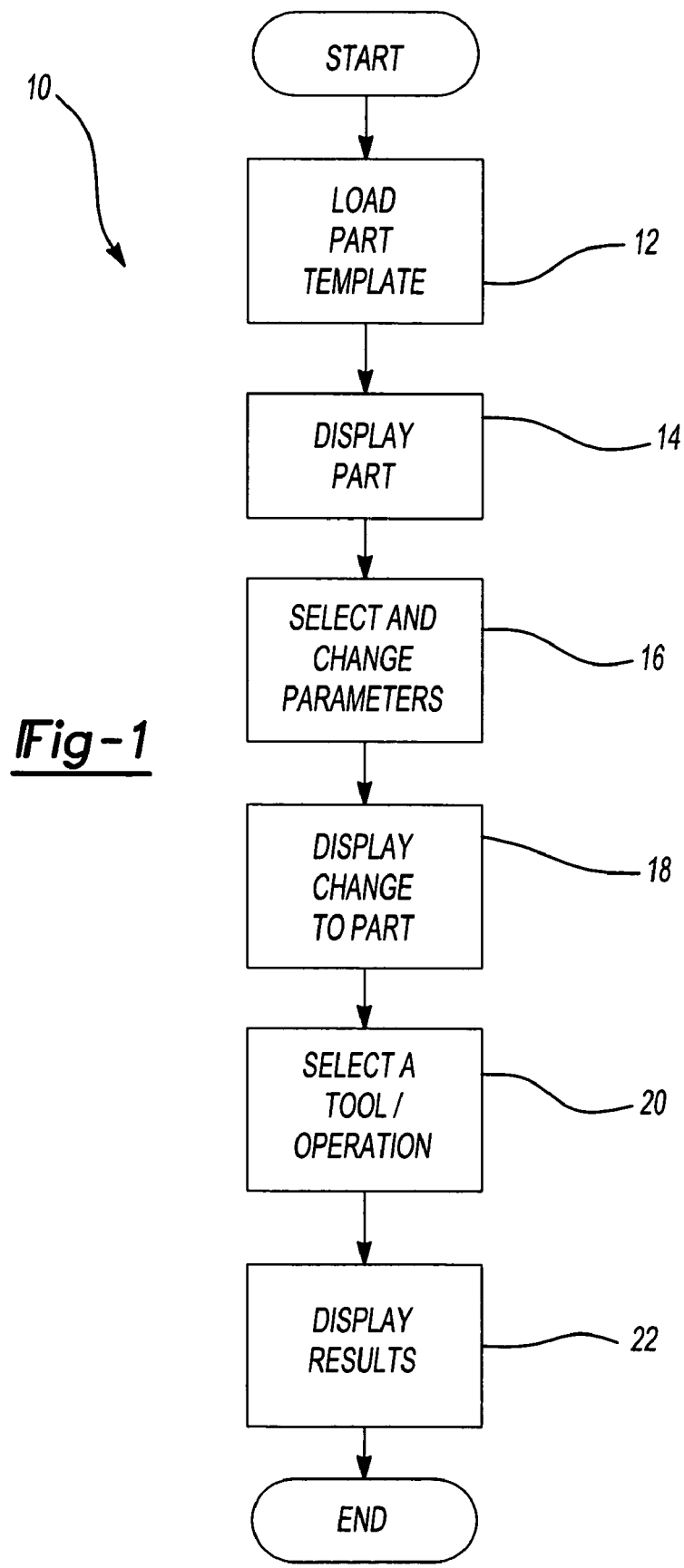
FIG. 1 is an automated tool and part modeling algorithm according to the present invention.

An automated tool and part modeling algorithm 10 is shown in FIG. 1. At step 12, a user selects a part and the algorithm 10 loads the part template. In the preferred embodiment, the user selects the part at a graphical user interface. The part template may include any suitable reference information indicating the dimensions of the part. For example, the part template may include, but is not limited to, parametric tooling data and the geometry of the tool and/or part. The part is displayed three-dimensionally to the user at the graphical user interface at step 14. At step 16, the user selects and changes a parameter in order to modify a particular feature or dimension of the part. For example, the user may change a location of a fastener, such as a bolt. The graphical user interface redisplays the part, reflecting the modified feature or dimension, at step 18. The part modeling algorithm automatically selects appropriate tools and/or operations to apply to the part at step 20. Alternatively, the user may remove, modify, or add additional operations such as drilling, cutting, or grinding to perform on the part. The tooling and/or machining data necessary for this process is embedded in the part template. The user may have the option of modifying the tooling or machining data, but it is not required. Because the tooling and/or machining data is embedded in the part template, it is not required that the user have any knowledge of the operations required to manufacture and process the part as designed. In this manner, the user is able to make changes to a part design without further knowledge of the tooling and/or machining required.

At step 22, the results of the tooling and/or operation of the part are displayed to the user. At this step, the user is able to determine if the modification at step 16 resulted in interference between the tool and the part. For example, the graphical user interface may display the interaction between the tool and the part. Alternatively, the algorithm 10 may perform a Boolean removal operation on the part to visually subtract the area of the part that the tool interferes with. The graphical user interface indicates the subtracted area of the part to the user. Additionally, the graphical user interface may indicate the interference to the user using other suitable means, such as a textual message or audio alert.

Figure 2:
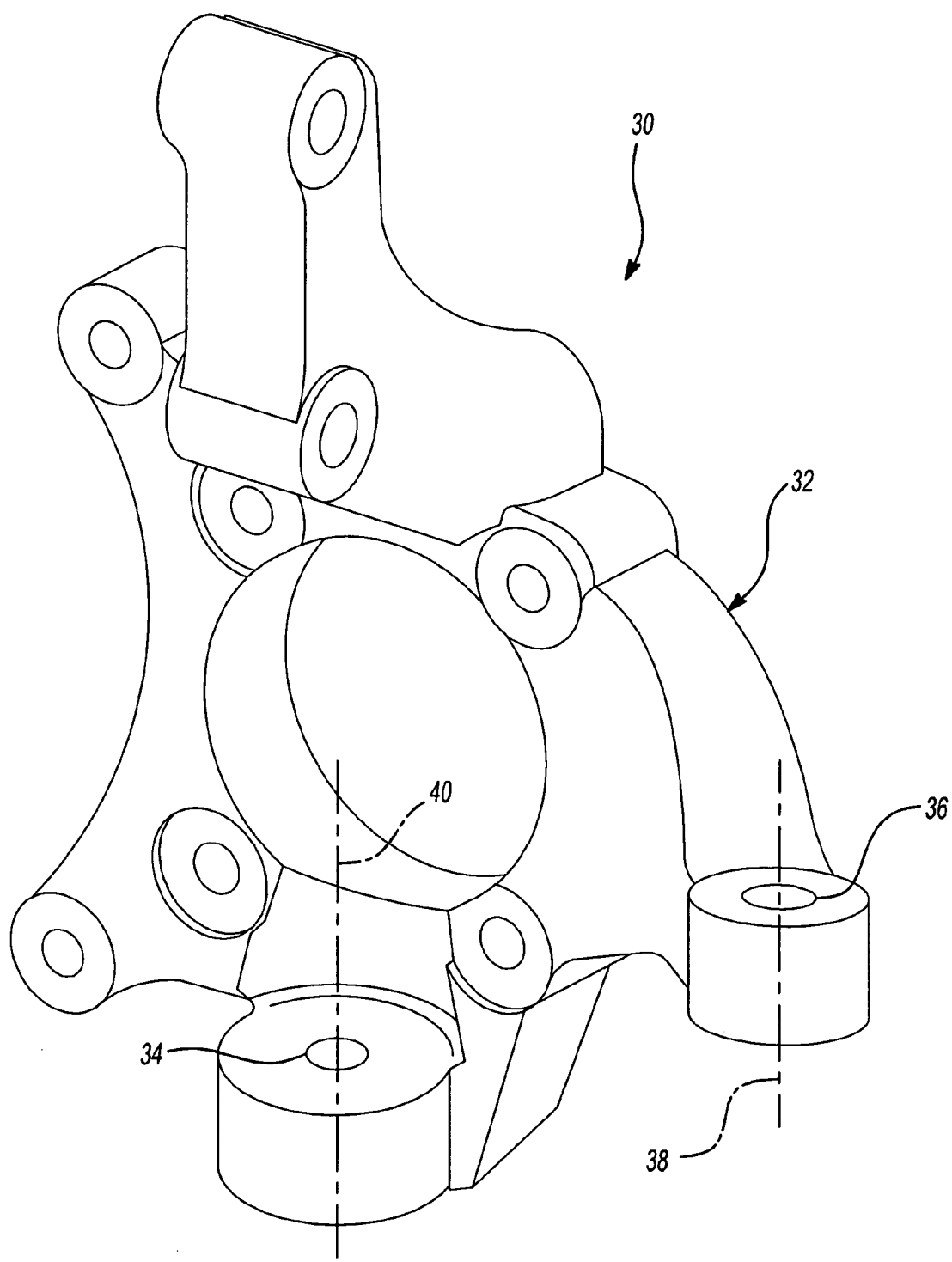
FIG. 2 illustrates a part template according to the present invention.

A user selects an automotive component and a part template 30 of the component is displayed at a graphical user interface as shown in FIG. 2. A part template 30 of a steering knuckle 32 is displayed at the graphical user interface. The user can change one or more parameters of the steering knuckle 32. For example, the user can reshape or resize the steering knuckle 32 and the graphical user interface automatically displays the changes to the steering knuckle 32. Parameters may include, but are not limited to, size and or angle of one or more bolt holes 34 and 36. In other words, the user can change the angle of the axis 38 of the bolt hole 34 in reference to an axis 40 of the part template 30.

Figure 3:
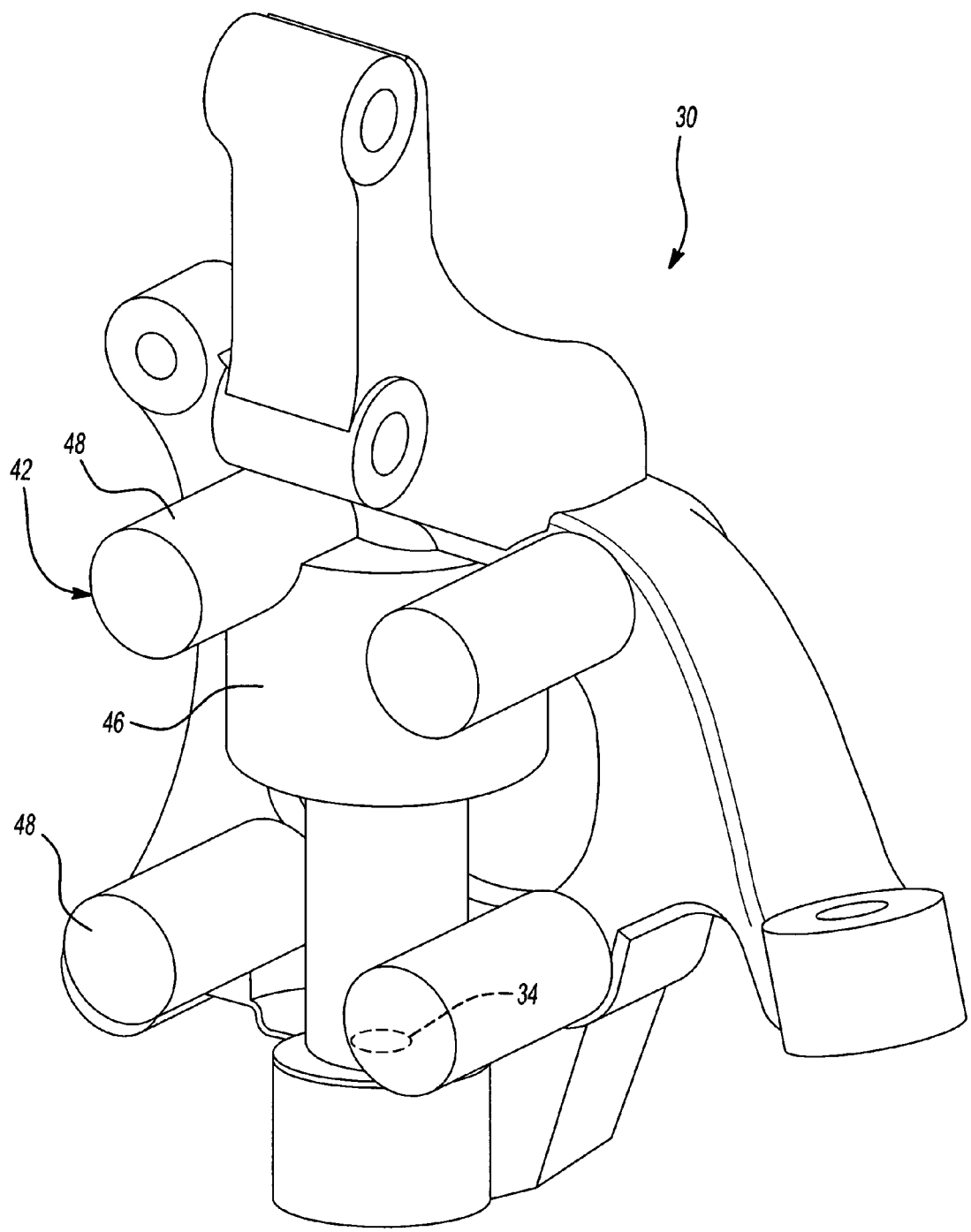
FIG. 3 illustrates a tooling template according to the present invention.
Figure 4:
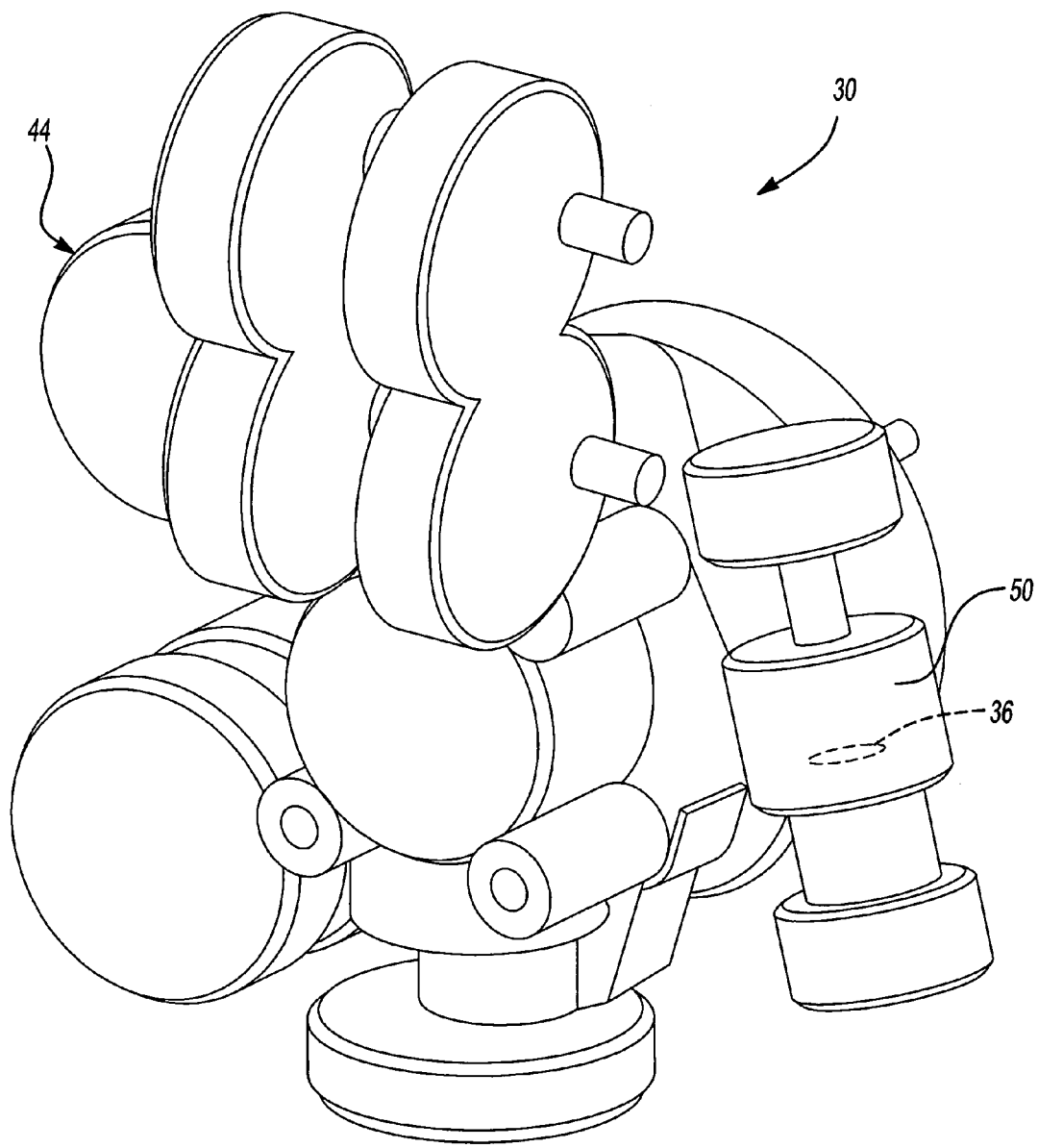
FIG. 4 illustrates a machining template according to the present invention.

The user selects a machining or tooling function as shown in FIGS. 3 and 4. The graphical user interface displays a tooling template 42 or a machining template 44 applied to the part template 30. The tooling template 42 includes a tool head 46 and one or more socket heads 48. Associated tooling information and geometry is embedded in the part template 30, so that the position and size of the tooling template 42 automatically changes when the geometry of the part is changed due to the user modification of the parameters. For example, as shown in FIG. 3, the angle of the bolt hole 34 is changed. The position and/or size of the tooling template 42 changes accordingly in order to accommodate the changes to the bolt hole 34. Similarly, in FIG. 4, the angle of the bolt hole 36 is changed. The machining template 44 includes one or more cutting or grinding elements 50. The position and/or size of the machining template 44 changes accordingly in order to accommodate the changes to the bolt hole 36.

In one aspect of the invention, the user is able to visually discern any interference between either the tooling template 42 or the machining template 44 and the part template 30 at the graphical user interface. As shown in FIG. 3, the modified bolt hole 34 caused the angle of the tooling template 42 to change in such a manner that an anterior portion of the tool head 46 interferes with a portion of the part template 30. As shown in FIG. 4, the modified bolt hole 36 caused the angle of the machining template in such a manner that the cutting element 50 interferes with a portion of the part template 30.

Figure 5:
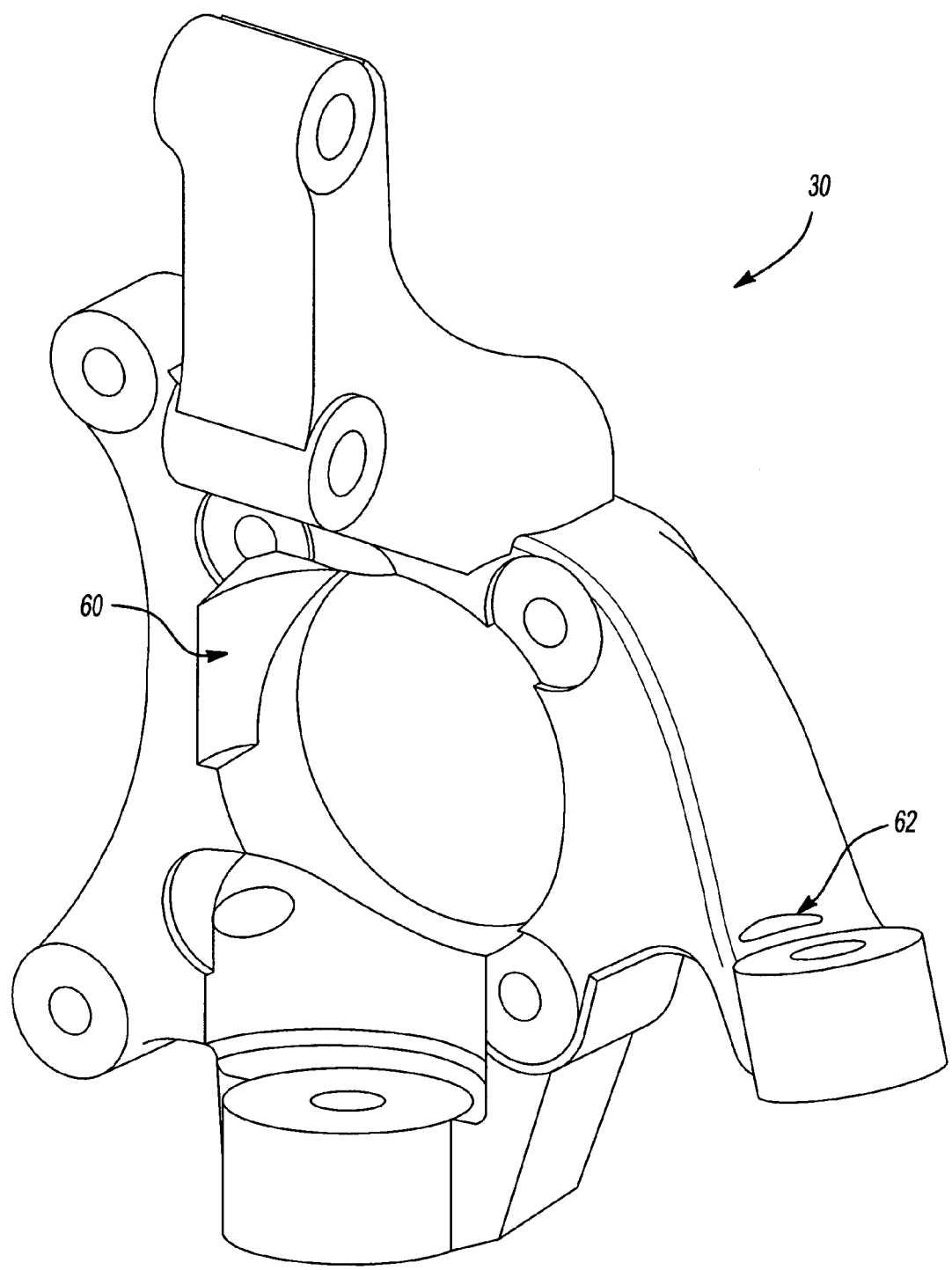
FIG. 5 illustrates a part template showing interferences between a tooling or machining template and the part template.

In another aspect of the invention, the graphical user interface identifies interference regions 60 and 62 directly on the part template 30 as shown in FIG. 5. Interference between the tool head 46 of FIG. 3 and the part template 30 resulted in interference region 60. Similarly, interference between the cutting element 48 and the part template 30 resulted in interference region 62.

In this manner, tooling and machining interferences can be detected in the early stages of part design. In the preferred embodiment, this modeling technique is used on a CAD system capable of parametric design as is known in the art. The part structure, as well as any machining, assembly, or handling tooling can be modeled concurrently in the same parametric model of the part.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tooling and part design method comprising:
    selecting a mechanical component;
    determining data that is indicative of the mechanical component;
    modifying the data in order to alter one or more dimensions of the mechanical component;
    automatically selecting one or more tooling functions to perform on the mechanical component from tooling data embedded within the data indicative of the mechanical component; and
    identifying interference between the one or more tooling functions and the mechanical component automatically.

2. The method of claim 1 further comprising:
    displaying the mechanical component to a user; and
    displaying the mechanical component to the user after altering the one or more dimensions.

3. The method of claim 1 wherein the step of determining the data includes generating at least one of a template of the mechanical component, geometric data of the mechanical component, and/or a parametric design of the mechanical component.

4. The method of claim 1 wherein the step of modifying includes selecting a parameter of the mechanical component and changing a value of the parameter.

5. The method of claim 1 wherein the step of selecting one or more tooling functions includes selecting at least one of machining, clamping, handling, and/or processing the mechanical component.

6. The method of claim 1 wherein the step of identifying includes displaying the one or more tooling functions and the mechanical component.

7. A tooling and part design method comprising:
    selecting a mechanical component;
    determining data that is indicative of the mechanical component;
    displaying the mechanical component
    modifying the data in order to alter one or more dimensions of the mechanical component;
    displaying the altered dimensions of the mechanical component;
    automatically selecting a tooling function to perform on the mechanical component from tooling data embedded within the data indicative of the mechanical component; and
    identifying interference between the tooling function and the mechanical component automatically.

* * * * *